Patented May 15, 1934

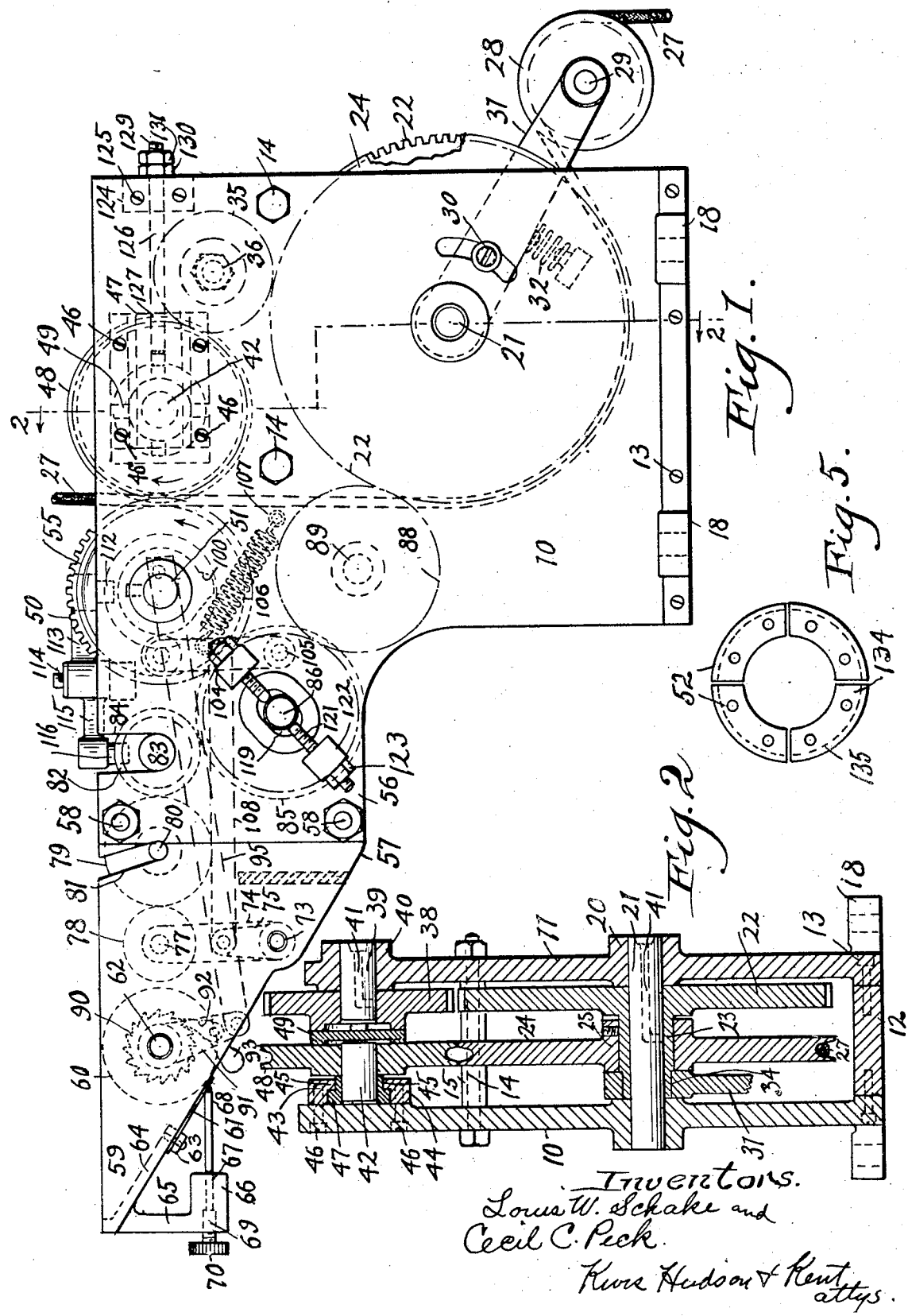

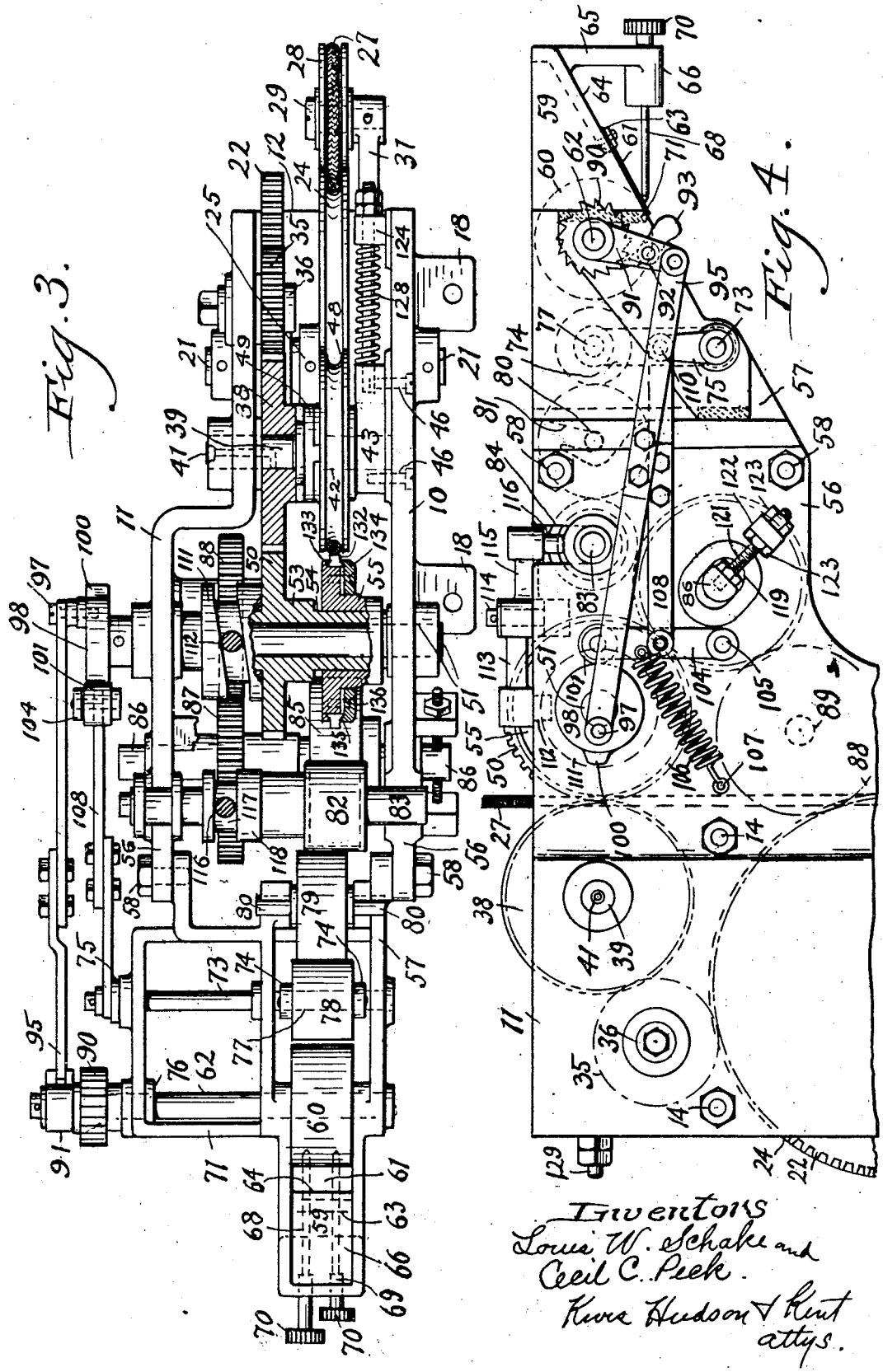

1,958,717

UNITED STATES PATENT OFFICE 1,958,717

CABLE MARKING MACHINE

Louis W. Schake, South Euclid, and Cecil C. Peck, Cleveland, Ohio, assignors, by mesne assignments, to General Motors Corporation, Detroit, Mich., a corporation of Delaware Application January 31, 1930, Serial No. 424,772

24 Claims. (Cl. 101—36)

This invention relates to cable marking machines, and while the invention is of general application, the preferred embodiment disclosed herein is suitable for printing trade marks or measurement indicia and the like, on the insulating covering of electrical conductors, such as cables for use as leads from the distributors to the respective spark plugs of an internal combustion engine.

It is an object of the present invention to provide a machine of the character described which will be well adapted for the purposes set forth, simple, efficient and practical in construction and operation, fool proof, and not likely to get out of order.

Other objects and features of novelty will be apparent as the following description proceeds, as taken in conjunction with the accompanying drawings, in which Figure 1 is an elevation of a machine according to the preferred embodiment of the present invention;

Fig. 2 is a vertical cross section taken along the line 2—2 of Fig. 1;

Fig. 3 is a top plan view of the machine shown in Fig. 1, portions thereof being broken away and shown in section to illustrate details of construction;

Fig. 4 is an elevation of the upper portion of the opposite side of the machine; and Fig. 5 is a detail of a retaining flange for securing interchangeable type to a type wheel.

Referring more particularly to the drawings, the machine comprises a pair of side members 10 and 11, preferably castings having bosses formed therein to receive transverse shafts extending therebetween and carrying rotatable parts to be hereinafter described in detail. A base member 12 is secured to the bottoms of the members 10 and 11 by machine screws 13. Tie bolts or bars 14 extend between the side members 10 and 11 and carry spacer sleeves 15. The side members 10 and 11 and the base 12 assembled as described above form the frame of the machine, which is provided with laterally projecting lugs 18 adapted to receive hold-down bolts.

Mounted in the side plates 10 and 11 is a fixed shaft 21 having journalled thereon a large drive gear 22. The gear 22 has a laterally extending hub 23 on which is mounted a peripherally grooved main drive pulley 24 having a hub 25 rigidly secured on the hub 23.

A peripherally grooved idler pulley 28 is journalled on a stub shaft 29 carried by an arm 31. The other end of the arm 31 is pivoted on a reduced extension 34 of the hub 23, so that the arm may be adjusted about its pivot, either by a set screw 30, or automatically by a spring 32.

The cable to be marked and indicated by the reference character 27 enters the machine by passing over the pulley 28 and around the main drive pulley 24. From the pulley 24 the cable passes vertically upward past a printing mechanism and thence out of the machine. At some distance from the machine, the cable is wound on a drum, (not shown) exerting a pull or tension on the cable, which, being transmitted to the drive pulley 24, may serve as the sole driving power for the machine, although other driving means are contemplated.

The drive gear 22 meshes with an idler gear 35 journalled on a short shaft 36 carried by the side frame member 11. The idler gear 35 in turn meshes with a platen drive gear 38 journalled on a short shaft 39 carried by the side frame member 11. The shafts 21 and 39 are drilled as at 41 to receive means for oiling the rotary elements carried thereby.

Substantially opposite the shaft 39 is a second short shaft 42 and to adjustably support this shaft a pair of horizontal members 43 and 44 having inwardly directed flanges 45 are secured to the inner surface of the side frame member 10 as by machine screws 46. Slidable in the way formed by the guides 45 is a bearing member 47 which carries the shaft 42. Carried by the shaft 42 is a platen pulley 48 having a peripheral groove for receiving the cable and portions of this pulley and the gear 38 are constructed to cooperate with an Oldham coupling 49.

The gear 38 also meshes with a type wheel drive gear 50 carried by a shaft 51 journalled in the respective side frame members 10 and 11. The hub 53 of the gear 50 is provided with a reduced extension 54 on which is keyed a type wheel 55, details of which will be hereinafter described. The cable being drawn upwardly between the type wheel and platen wheel will receive impressions therealong in an obvious manner. As hereinbefore described, the pulleys 28, 24 and 48 are provided with peripheral grooves which receive the cable. Thus the sides of the grooves form flanges which support the side surfaces of the cable. This is of particular importance with respect to the platen wheel 48, as it prevents lateral movement of the cable while the impression is being made by the type wheel 55.

The side frame members 10 and 11 have projections 56 at the upper sides thereof. A supplemental frame 57 is secured to the projections 56 as by means of bolts 58, and supports the inking mechanism of the machine. The outer end of the frame 57 houses an ink fountain 59 comprising a fountain roller 60 and an ink knife 61. The fountain roller is carried by a shaft 62, journalled in frame 57, and the ink knife 61 is secured by a reinforcing strip 63 to a web 64 extending between the sides of the frame 57. A bracket 65 depends from the frame 57 and carries bosses 66 provided with bores 67 carrying rods 68, the inner ends of which bear against the lower end of the ink knife 61. The outer ends of the bores 67 and rods 68 are enlarged and threaded, as at 69, and the rods are provided with knurled knobs 70 by means of which the pressure on the blade 61 may be adjusted. The portion of the frame 57 which is secured to the side frame member 11 has a lateral extension 71 provided with bearings to receive the shaft 62.

Journalled in the lower portion of the frame 57 is a shaft 73 having keyed thereto a pair of upstanding arms 74 and a crank arm 75. The upper ends of the arms 74 receive a shaft 77 carrying a ductor roller 78 adapted to oscillate between the fountain roller 60 and a transfer roller 79 having trunnions 80 received in inclined slots 81 provided in the frame member 57. The weight of the roller 79 acting on the trunnions 80 in the inclined slots 81 causes the transfer roller to bear against the periphery of a distributor roller 82 carried by shaft 83, the ends of which are received in vertical slots 84 in the respective side members. The distributor roller 82 in turn contacts with a form roller 85 sleeved on a shaft 86. Keyed on the shaft 86 is an inking mechanism drive gear 87 meshing with one half of a double gear 88 carried by a shaft 89. The other half of the gear 88 meshes with the main drive gear 22 hereinbefore described and thus positively drives the roller 85, from which the rollers 82 and 79 are driven by frictional engagement.

Means are provided for intermittently rotating the fountain roller 60 in timed relation to the operation of the machine. Accordingly, a ratchet wheel 90 is keyed on shaft 62, and a link 91 pivoted on the shaft 62 carries a pawl 92 cooperating with the ratchet wheel. The pawl has a weighted extension 93, so that the pawl is held by gravity in engagement with the ratchet 90. The lower end of the link 91 is pivoted to one end of an adjustable link 95, the other end of which is pivoted eccentrically as at 97 on a disk 98, secured on the outer end of the type roller shaft 51. It will be obvious that rotation of the disk 98 will result in reciprocation of the link 91, causing the pawl 92 to ride over the ratchet teeth, and the return reciprocation will rotate the fountain roller step by step.

Means are provided for imparting an oscillating movement to the ductor roller 78, from a position in contact with the fountain roller 60 to a position in contact with the transfer roller 79. For this purpose, a peripheral cam 100 is provided on the disk 98 and coacts with a roller follower 101, carried at the end of a lever 104 pivoted on a stud 105 carried by the side frame 11. A helical spring 106 is connected intermediate the ends of the lever 104 and is secured at its other end to a pin 107 carried by the side frame 11. An intermediate portion of the lever 104 is pivoted to a two-part adjustable arm or link 108. The other end of the link 108 is pivotally connected to the arm 75, as at 110. It will be obvious that rotation of the disk 98 will cause the cam 100 to urge the roller 101 laterally, causing the lever 104 to swing about the pivot 105, the roller 101 being held in contact with the periphery of the disk 98 by the spring 106. Oscillation of the lever 104 will be transmitted by the link 108 to the crank arm 75 which, being rigid with the arms 74 in which the shaft 77 is journalled, will impart the desired oscillation to the ductor roller 78 in timed relation to the operation of the machine.

Means are also provided for imparting axial movement to the distributor roller 82. Accordingly, a peripherally grooved cam 111 is keyed to the shaft 51 and receives a pin follower 112 carried by an arm 113 of a two-arm lever pivoted intermediate its ends on a stud 114, rigidly mounted on the side frame 11. The other arm 115 of the two-arm lever carries a pin 116 which rides in a groove 117 in a collar 118 sleeved on the shaft 83 with the ductor roller 82. It will be readily apparent that rotation of the shaft 51 and the cam 111 will impart a lateral movement to the two-arm lever by means of the pin 112. This oscillatory movement will be transmitted by the pin 116 riding in the groove 117 to the ductor roller 82.

It is important to secure a nice adjustment of the pressure exerted on the type wheel 55 by the form roller 85. For this purpose, the shaft 86 is mounted in angularly disposed elongated slots 119 in each of the side frame members 10 and 11. Adjusting screws 121 are carried by lugs 122 projecting laterally from each side frame member. Lock nuts 123 are provided for engaging the lugs, and by relative adjustment of the screws the center of the shaft 86 may be adjusted to a nicety.

It is desirable to adjust the pressure of the platen pulley 48 with respect to the type wheel 55. It is also desirable to provide means permitting the platen pulley 48 to yield away from the type wheel 55 when, for any reason, undue pressure occurs therebetween, as by means of a foreign object carried by the cable 27, or by variations in the diameter of the same. For these purposes, an apertured lug 124 is secured to the inside of the rear end of the side member 10 near the top thereof, as by means of machine screws 125. Slidable in the lug 124 is a bolt 126, the inner end of which is threaded as at 127 to engage the slide 47 hereinbefore described. A helical spring 128 is interposed between the lug 124 and the adjacent end of the slide 47. The outer end of the bolt 126 is also threaded as at 129 and receives a nut 130 and a lock nut 131 which adjust the maximum inward movement of the shaft 42. The spring 128, therefore, causes the nut 120 to bear against the outer surface of the lug 124 under the compression of the spring.

The type wheel 55 is constructed to receive interchangeable type 132. Accordingly the wheel blank is provided with a groove 133, preferably undercut to receive type having dovetailed, or inclined base portions. A flat annular disk 134 has a central aperture fitting over the hub 55, and a peripheral flange 135, preferably inturned to correspond to the groove 133, and cooperate therewith to form a peripheral type receiving channel for the wheel 55. This disk is cut into a plurality of segments 52, which are secured by machine screws 136, in the wheel blank, but which permit removal thereof to replace the type. It is obvious that the cooperating portions of the blank and disk may be modified to receive various kinds of type, and while it is preferred to provide only a single line of type, reading in the direction of travel of the cable, this provision is not essential.

While one embodiment of the invention has been illustrated and described in sufficient detail to enable anyone skilled in the art to practice the invention, the scope of the invention is not limited to any of the details disclosed other than as necessitated by the prior art, but instead embraces such embodiments of the broad idea as fall within the scope of the appended claims.

Having thus described our invention, we claim:

1. In a machine of the character described, the combination of a frame, a platen wheel rotatably supported in said frame, a drum rotatably supported in said frame and adapted to be rotated by the work as it passes through the machine, means for driving said platen wheel from said drum, a type wheel rotatably supported in said frame adjacent said platen wheel, means for inking said type wheel, and means for driving said type wheel from said drum.

2. In a machine of the character described, the combination of a frame, a type wheel rotatably supported by said frame, means for inking said type wheel, a platen wheel cooperating with said type wheel and adapted to engage and support the sides of the work to prevent lateral movement during printing, a work supporting drum rotatably supported by said frame and adapted to be driven by the engagement of the work therewith as the work is pulled through the machine, and means for driving said type wheel from said drum.

3. In a machine of the character described, the combination of a frame, a type wheel rotatably supported by said frame, means for inking said type wheel, a platen wheel cooperating with said type wheel and adapted to engage and support the side surfaces of the work to prevent lateral movement thereof during the printing operation, a work supporting drum rotatably supported by said frame and adapted to be driven by the work as it is pulled through the machine, and means for driving said platen wheel and said inking means from said work supporting drum.

4. In a machine of the character described, the combination of a frame, a type wheel rotatably supported by said frame, means for inking said type wheel, a platen wheel cooperating with said type wheel and adjustably supported for movement toward and away from the latter, driving means including a work-supporting drum driven by the work as the latter is pulled through the machine, and a flexible coupling operatively connecting said driving means with said platen wheel.

5. In a machine of the character described, the combination of a platen, a type wheel, means for supplying ink to the type wheel and means operated by the work moving through the machine for driving the type wheel independently of the engagement of the type wheel with the work.

6. In a machine of the character described, the combination of a platen wheel, a type wheel, means for supplying ink to the type wheel, and means operated by the work moving through the machine for driving the platen wheel independently of the enagagement of the platen wheel with the work.

7. In a machine of the character described, the combination of a platen wheel, a type wheel, means for supplying ink to the type wheel, and means operated by the work moving through the machine for driving the type and platen wheels independently of the engagement of said wheels with the work.

8. In a machine of the character described, the combination of a platen wheel, a type wheel, means for supplying ink to the type wheel, and means operated by the work moving through the machine for operating the ink-supplying means independently of the movement of the type wheel.

9. In a machine of the character described, the combination of a platen, a type wheel, means for supplying ink to the type wheel, and means operated by the work moving through the machine for driving the type wheel independently of the engagement of the type wheel with the work and for operating the ink-supplying means.

10. In a machine of the character described, the combination of a platen wheel, a type wheel, means for supplying ink to the type wheel, and means operated by the work moving through the machine for driving the platen wheel independently of the engagement of the platen wheel with the work and for operating the ink-supplying means.

11. In a machine of the character described, the combination of a platen wheel, a type wheel, means for supplying ink to the type wheel, and means operated by the work moving through the machine for driving the type and platen wheels independently of the engagement of said wheels with the work and for operating the ink-supplying means.

12. In a machine of the character described, the combination of a platen, a type wheel, an ink container, and means operated by the work moving through the machine for transferring ink from the container to the type wheel independently of the movement of the type wheel.

13. In a machine of the character described, the combination of a platen, a type wheel, means for distributing ink, means for transferring distributed ink to the type wheel, and means operated by the work moving through the machine for operating the ink-distributing means and the ink-transferring means independently of the movement of the type wheel.

14. In a machine of the character described, the combination of a platen, a type wheel, an ink container, means for distributing ink, means for transferring ink from the container to the ink-distributing means, means for transferring ink from the ink-distributing means to the type wheel, and means operated by the work moving through the machine for operating the ink-distributing means and both of said ink-transferring means independently of the movement of the type wheel.

15. In a machine of the character described, the combination of a platen, a type wheel, an ink container, and means operated by the work moving through the machine for transferring ink from the container to the type wheel and for driving the type wheel.

16. In a machine of the character described, the combination of a platen wheel, a type wheel, an ink container, and means operated by the work moving through the machine for transferring ink from the container to the type wheel and for driving the platen wheel.

17. In a machine of the character described, the combination of a platen wheel, a type wheel, an ink container, and means operated by the work moving through the machine for transferring ink from the container to the type wheel, and for driving the type wheel and the platen wheel.

18. In a machine of the character described, the combination of a platen, a type wheel, means for distributing ink, means for transferring distributed ink to the type wheel, and means operated by the work moving through the machine for operating the ink-distributing means and the ink-transferring means and for driving the type wheel.

19. In a machine of the character described, the combination of a platen wheel, a type wheel, means for distributing ink, means for transferring distributed ink to the type wheel, and means operated by the work moving through the machine for operating the ink-distributing means and the ink-transferring means and for driving the platen wheel.

20. In a machine of the character described, the combination of a platen wheel, a type wheel, means for distributing ink, means for transferring distributed ink to the type wheel, and means operated by the work moving through the machine for operating the ink-distributing means and the ink-transferring means, and for driving the type wheel and the platen wheel.

21. In a machine of the character described, the combination of a platen, a type wheel, an ink container, means for distributing ink, means for transferring ink from the container to the ink-distributing means, means for transferring ink from the ink-distributing means to the type wheel, and means operated by the work moving through the machine for operating the ink-distributing means and both of said ink-transferring means, and for driving the type wheel.

22. In a machine of the character described, the combination of a platen wheel, a type wheel, an ink container, means for distributing ink, means for transferring ink from the container to the ink-distributing means, means for transferring ink from the ink-distributing means to the type wheel, and means operated by the work moving through the machine for operating the ink-distributing means and both of said ink-transferring means, and for driving the platen wheel.

23. In a machine of the character described, the combination of a platen wheel, a type wheel, an ink container, means for distributing ink, means for transferring ink from the container to the ink-distributing means, means for transferring ink from the ink-distributing means to the type wheel, and means operated by the work moving through the machine for operating the ink-distributing means and both of said ink-transferring means, and for driving the type wheel and the platen wheel.

24. In a machine of the character described, a platen for receiving the work, a type carrier, means for applying ink to the type on the carrier, and means actuated by the movement of the work through the machine for effecting operation of the ink-applying means independently of the movement of the type carrier and for causing the type to be applied to the work.

LOUIS W. SCHAKE.
CECIL C. PECK.